United States Patent [19]

Seiderman

[11] 4,383,420
[45] May 17, 1983

[54] CONTROL APPARATUS FOR AUTOMOTIVE AIR CONDITIONER

[76] Inventor: Abe Seiderman, 7365 SW. 132nd St., Miami, Fla. 33156

[21] Appl. No.: 302,773

[22] Filed: Sep. 16, 1981

Related U.S. Application Data

[62] Division of Ser. No. 169,994, Jul. 18, 1980.

[51] Int. Cl.³ .............................................. F25B 27/00
[52] U.S. Cl. .................................... 62/323.4; 62/158; 180/333; 180/336
[58] Field of Search ................... 340/53, 531; 367/197, 367/199; 180/333, 336; 62/323.4, 158, 231

[56] References Cited

U.S. PATENT DOCUMENTS

| | | | |
|---|---|---|---|
| 3,268,680 | 8/1966 | Anderson | 180/333 |
| 3,970,987 | 5/1974 | Kolm | 340/310 A |
| 4,071,839 | 1/1978 | Hollins | 340/53 |
| 4,142,375 | 3/1979 | Abe et al. | 62/231 |

*Primary Examiner*—Albert J. Makay
*Assistant Examiner*—Harry Tanner
*Attorney, Agent, or Firm*—Oltman and Flynn

[57] ABSTRACT

On an automotive vehicle having a stick-shift transmission, the air conditioner is turned off when the driver closes a switch in the handle of the gear shift lever to turn on an ultrasonic transmitter. A timer keeps the air conditioner off, following the signal from the ultrasonic transmitter, for a time interval long enough for the driver to shift through the lower gears and into high gear.

5 Claims, 5 Drawing Figures

CONTROL APPARATUS FOR AUTOMOTIVE AIR CONDITIONER

CROSS-REFERENCE TO RELATED APPLICATION

This application is a division of my copending U.S. patent application, Ser. No. 06/169,994, filed July 18, 1980.

SUMMARY OF THE INVENTION

This invention relates to an apparatus for turning off the air conditioner in an automotive vehicle with a stick-shift transmission while the transmission is being shifted through the low gears.

Various arrangements have been proposed heretofore which operate off the vehicle engine intake manifold to turn off the air conditioner while the vehicle is accelerating. U.S. Pat. No. 3,918,543 to Halem discloses such an arrangement.

The present invention is directed to a novel apparatus in which the air conditioner is on when the transmission is in neutral, such as when the vehicle is paused at a stop light, and when the transmission is in high gear. The air conditioner is turned off while the transmission is being shifted from neutral through the lower gears and into high gear, thereby reducing the load on the engine while the vehicle is accelerating. A substantial amount of fuel is saved. The present invention avoids undue frequent acceleration of the air conditioner compressor since the compressor will be on only while the engine is idling in neutral or the engine has settled down into a relatively low RPM in high gear. The interior cooling of the vehicle is not seriously affected by turning off the air conditioner during the usually brief interval required to shift through the lower gears. Several embodiments of the invention are disclosed which are adapted for relatively simple attachment to a vehicle having a gear shift lever-operated transmission, whether three speed, four speed or five speed, and having any shifting pattern.

A principal object of this invention is to provide a novel and improved apparatus for turning off the air conditioner in an automotive vehicle while the vehicle transmission is being shifted manually through the lower gears.

Another object of this invention is to provide such an apparatus having an ultrasonic transmitter located in the handle on top of the gear shift lever and turned on by a manual switch in the handle, and a receiver which responds to this transmitter to keep the air conditioner off while the vehicle transmission is being shifted through the lower gears.

Further objects and advantages of this invention will be apparent from the following detailed description of a presently-preferred embodiment thereof, which is shown in the accompanying drawing.

DETAILED DESCRIPTION

Before explaining the disclosed embodiment of the invention in detail, it is to be understood that the invention is not limited in its application to the details of the particular arrangement shown since the invention is capable of other embodiments. Also, the terminology used herein is for the purpose of description and not of limitation.

Figure 5:
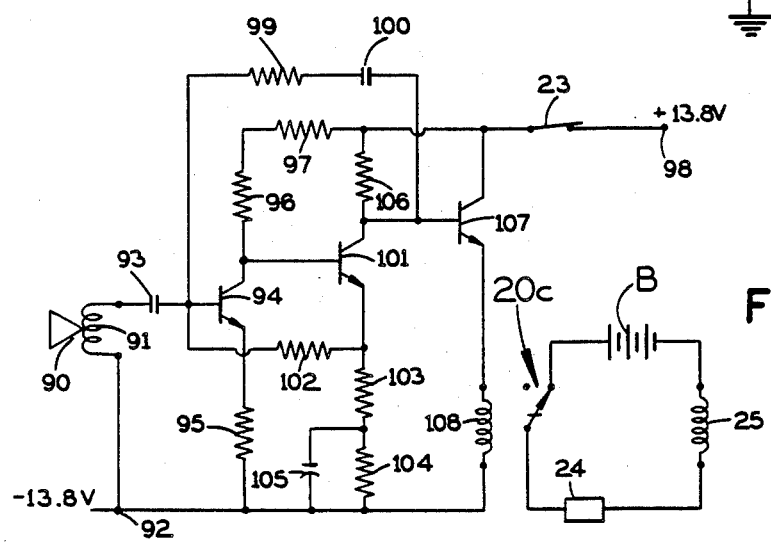
FIG. 5 is a schematic electrical circuit diagram of a control circuit for the vehicle air conditioner, including a receiver which responds to the ultrasonic transmitter of FIG. 4.

Referring first to FIG. 5, the compressor of the air conditioner on the car or other vehicle is driven from the vehicle engine through a clutch (not shown) which has an operating coil 25. When the coil 25 is energized, the clutch is engaged and the air conditioner compressor is on. When the coil 25 is de-energized, the clutch is disengaged and the air conditioner compressor is off. The energization circuit for the clutch coil 25 includes the vehicle battery B, a timer 24 and relay contacts 20c operated by a relay coil 108.

The timer 24 is of known design and includes a relay (not shown) having normally-closed contacts which open in response to the opening of relay contacts 20c and remain open for a predetermined time interval, which may be set by a rotatably adjustable control knob. Typically the control knob is set to establish a time delay of about six seconds between the opening of relay contacts 20c and the closing of the relay contacts in timer 24.

Figure 1:
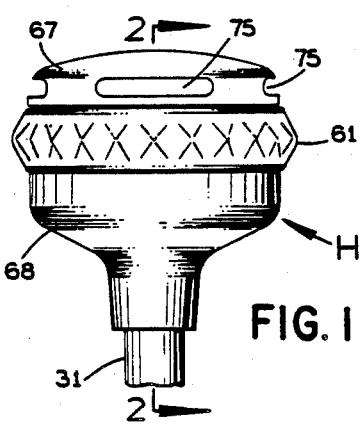
FIG. 1 is an elevational view of the knob or handle on the upper end of a gear shift lever on a vehicle with a stickshift transmission.
Figure 2:
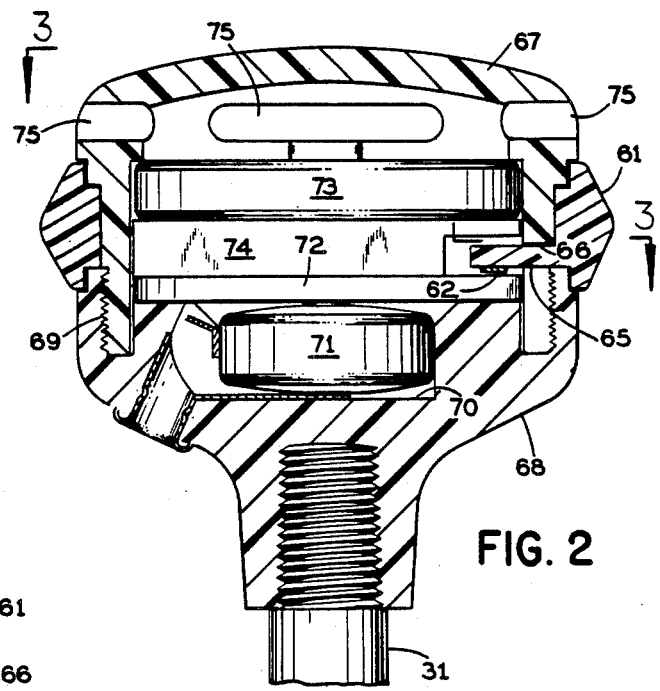
FIG. 2 is an enlarged vertical cross-section taken along the line 2—2 in FIG. 1 and showing an ultrasonic transmitter inside the handle on the gear shift lever.
Figure 3:
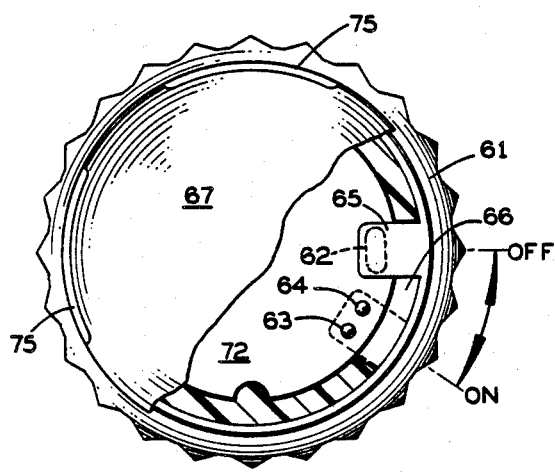
FIG. 3 is a view taken along the line 3—3 in FIG. 2, showing details of the switch in this handle.

An ultrasonic transmitter of known design is mounted in the handle or knob H (FIG. 1) on the top of the gear shift lever 31 for the vehicle transmission. This handle carries a ring 61 on the outside which may be rotated a few degrees in one direction to close a switch for turning on the transducer. As shown in FIG. 2, this ring carries a downwardly facing switch contact 62 inside the handle H which engages a pair of upwardly-facing switch contacts 63 and 64 when the ring 61 is rotated clockwise in FIG. 3 from the full line position to a position in which it bridges the fixed contacts 63 and 64. The switch contact 62 is connected to the ring 61 by a radial arm 65 extending through an arcuate slot 66 in the side of the handle H. Preferably, this radial arm is formed integral with the ring 61. Both the handle H on the top of the gear shift lever 31 and the ring 61 are of suitable dielectric material.

The handle H is composed of screw-threadedly connected upper and lower members 67 and 68, the upper member 67 having its lower end externally screw-threaded and threadedly engaging internal screw threads on the upper end of the lower member 68, as shown at 69 in FIG. 2. The arcuate slot 66 is formed in the upper member 67 of the handle. The lower member 68 of the handle is formed with an upwardly facing recess 70 in which a battery 71 is seated. A printed circuit board 72, which carries electrical components of the circuit for energizing the ultrasonic transducer, overlies the top of the bottom handle member 68. The transducer 73 is an electroacoustic transducer of known design operating at a frequency of 40 Hz. and located inside the hollowed out interior of the upper handle member 67, resting on a spacer 74 of suitable dielectric material which overlies the printed circuit board 72. The upper handle member 67 is formed with a plurality of circumferential openings 75 for passing the ultrasonic pressure waves generated by the transducer when it is energized.

Figure 4:
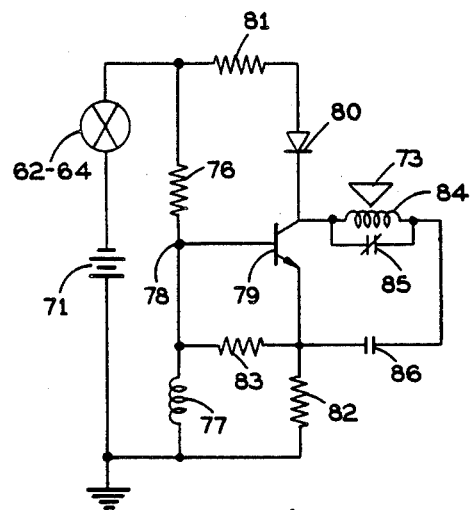
FIG. 4 is a schematic electrical circuit diagram of the ultrasonic transmitter in the gear shift lever handle shown in FIGS. 1-3.

FIG. 4 shows schematically the electrical circuit for the ultrasonic transmitter which includes the transducer 73, the circuitry on the printed circuit board 72, the battery 71, and the ring-operated switch 62-64. The ring switch serves as an on/off switch in series with the battery 71. A resistor 76 and an inductance 77 are connected in series with each other across the battery 71 and switch 62-64. The junction point 78 between resistor 76 and inductance 77 is connected to the base of a transistor 79. The collector of this transistor is connected through a rectifier diode 80 and a resistor 81 to the switch 62-64. The emitter of transistor 79 is connected through a resistor 82 to the grounded lower terminal of battery 71. A resistor 83 is connected between the base and the emitter of transistor 79. A parallel combination of inductance 84 and variable capacitance 85 is connected between the collector of transistor 79 and a capacitor 86 connected to the emitter of transistor 79. When the on/off ring switch 62-64 is closed, these circuit elements function as a 40 Hz. oscillator for exciting the electroacoustic transducer 73 in a known manner. The transducer 73, when so excited, produces ultrasonic pressure waves which pass out through the slots 75 in the upper handle member 67 for reception by a receiver tuned to this frequency.

Referring again to FIG. 5, this receiver comprises a pickup transducer 90 having an inductance 91 whose lower end is connected to a $-13.8$ volt terminal 92. The upper end of inductance 91 is connected through a capacitor 93 to the base of a transistor 94. The emitter of transistor 94 is connected through a resistor 95 to the $-13.8$ volt terminal 92. The collector of transistor 94 is connected through series-connected resistors 96 and 97 and the on/off or thermostatic switch 23 for the air conditioner to a $+13.8$ volt terminal 98.

A series-connected resistor 99 and capacitor 100 are connected between the base of transistor 94 and the collector of a second transistor 101. The collector of the first transistor 94 is connected directly to the base of the second transistor 101. The emitter of the second transistor 101 is connected through a resistor 102 to the base of the first transistor 94. The emitter of transistor 101 also is connected through a resistor 103 and a parallel-connected resistor 104 and capacitor 105 to the negative terminal 92. The collector of transistor 101 is connected through a resistor 106 to resistor 97 and switch 23.

The collector of the second transistor 101 is connected directly to the base of a third transistor 107. The collector of transistor 107 is connected directly to the juncture between resistors 97 and 106 and to switch 23. The emitter of transistor 107 is connected through the previously-mentioned relay coil 108 to the negative terminal 92.

As long as relay coil 108 is de-energized, its normally-closed contacts 20c complete the energization circuit for the clutch coil 25 through the timer 24. However, when relay coil 108 is energized, the mobile contact of 20c moves to the left in FIG. 5 and breaks this energization circuit.

In the operation of this embodiment, the driver closes the ring switch 62-64 to turn on transducer 73 before shifting from neutral through the lower gears. The ultrasonic signal broadcast by transducer 73 is received by the receiving transducer 90 and this causes relay coil 108 to be energized, breaking the energization circuit for the compressor clutch coil 25 and starting the timer 24, which functions as already described. The driver now opens the ring switch 62-64, turning off the broadcast transducer 73 and causing relay coil 108 to be de-energized. Consequently, the relay contacts 20c return to the position shown in FIG. 5, which leaves the compressor clutch coil 25 entirely under the control of the timer 24. Accordingly, when the latter's time interval (e.g., six seconds) runs out, the air conditioner will come on.

If desired, the ring switch 62-64 may be a grip switch which is normally open and is closed only while the driver is squeezing it closed. A capacity switch may also be used.

I claim:

1. On an automotive vehicle having an engine, a transmission, a gear shift lever for shifting said transmission, said gear shift lever having a handle on its outer end, and an air conditioner, the improvement which comprises:
   an ultrasonic transmitter in said handle for broadcasting an ultrasonic signal;
   a manual switch on said handle operable to turn on said transmitter;
   a receiver having an electroacoustic transducer for receiving the signal broadcast by said transmitter;
   and means operable by said receiver for turning off the air conditioner.

2. The apparatus recited in claim 1, wherein said means operable by said receiver for turning off the air conditioner comprises a relay.

3. The apparatus recited in claim 2, and further comprising:
   a timer operatively connected to said relay and said air conditioner to control the operation of the air conditioner jointly with said relay;
   said relay being operable in response to the signal broadcast by said transmitter to start the timer to cycle through a predetermined time interval;
   and said timer being operative to keep the air conditioner off throughout said time interval.

4. The apparatus recited in claim 3, wherein:
   said air conditioner has a compressor and an electrically-operated compressor clutch controlling the drive from the vehicle engine to said compressor;
   said relay has normally-closed relay contacts connected in series with said timer and said electrically-operated clutch to control the latter's energization;
   and said relay has a coil operatively connected to said receiver to be energized in response to the latter's reception of a signal from said transmitter, whereby to open said relay contacts to de-energize said compressor clutch and start the timer to cycle through said predetermined time interval.

5. The apparatus recited in claim 4, wherein said timer is operative to complete an energization circuit for said compressor clutch at the end of said time interval.

* * * * *